UNITED STATES PATENT OFFICE.

LUCIUS O'BRIEN, OF CROOKSTON, MINNESOTA.

COMPOSITION OF MATTER FOR BLACKBOARDS, &c.

SPECIFICATION forming part of Letters Patent No. 657,001, dated August 28, 1900.

Application filed April 5, 1900. Serial No. 11,783. (No specimens.)

*To all whom it may concern:*

Be it known that I, LUCIUS O'BRIEN, a citizen of the United States, residing at Crookston, in the county of Polk and State of Minnesota, have invented certain new and useful Improvements in Compositions of Matter; and I do declare the following to be a full, clear, and exact description of the invention, such as will enable others skilled in the art to which it appertains to make and use the same.

My invention relates to a composition of matter used in producing on the wall of a school building or other building where desirable blackboards for the use of pupils and others in demonstrating solutions of examples in mathematics, delineating maps, and the like in chalk; and the invention consists in a composition of putty-lime, sand, lampblack, vinegar, Portland cement, plaster-of-paris, and water in the manner and in the proportions as hereinafter set forth.

In compounding the composition of matter for blackboards I employ the following-named ingredients in substantially the proportions hereinafter set forth: I use twelve (12) pailfuls of putty-lime—that is, slaked lime made in water in about the consistency of putty or common plaster ready for application to a wall—nine (9) pailfuls of clean sharp sand, twenty-six (26) pounds of lampblack, one (1) quart of vinegar, one (1) pailful of Portland cement, and one (1) pailful of plaster-of-paris. The pail referred to is a common wooden pail holding about ten (10) or eleven (11) quarts. In mixing these ingredients and bringing them to proper consistency about two (2) pailfuls of water are used, and the mixture when completed will be about twenty-four (24) pailfuls, which will make about one hundred and twenty-five (125) square yards of blackboard. I use putty-lime in preference to any other kind of lime or substance because it takes the place of alcohol in "cutting" the lampblack and is much superior thereto and makes a much more durable board, one which will not absorb chalk or other foreign matter and rot or chip off, as in boards made up with alcohol or a similar substance or ordinary lime. The vinegar is used for the purpose of making the board spongy and springy, so that by being somewhat yielding it is much easier to work on.

Having thus fully described my invention, what I claim, and desire to secure by Letters Patent, is—

1. A composition of matter designed for use in the production of blackboards and like surfaces, the same consisting, essentially, of putty-lime, sand, lampblack, vinegar, Portland cement, plaster-of-paris, and water, combined substantially in the manner and proportions specified.

2. A blackboard composition which contains vinegar as an essential ingredient to render the composition spongy and springy, substantially as described.

In testimony whereof I have hereunto set my hand in presence of two subscribing witnesses.

LUCIUS·O'BRIEN.

Witnesses:
LOUIS E. GOSSMAN,
EDMUND M. WALSH.